Patented Aug. 28, 1923.

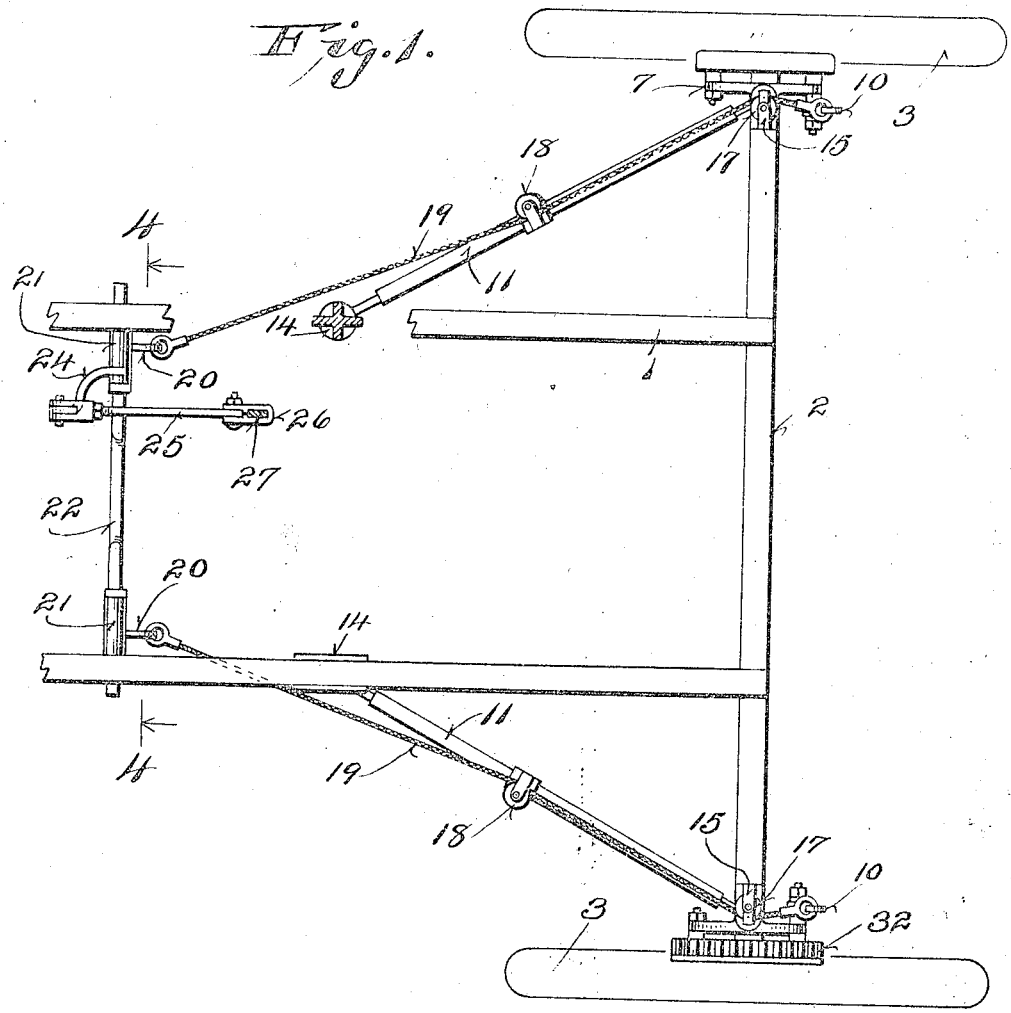

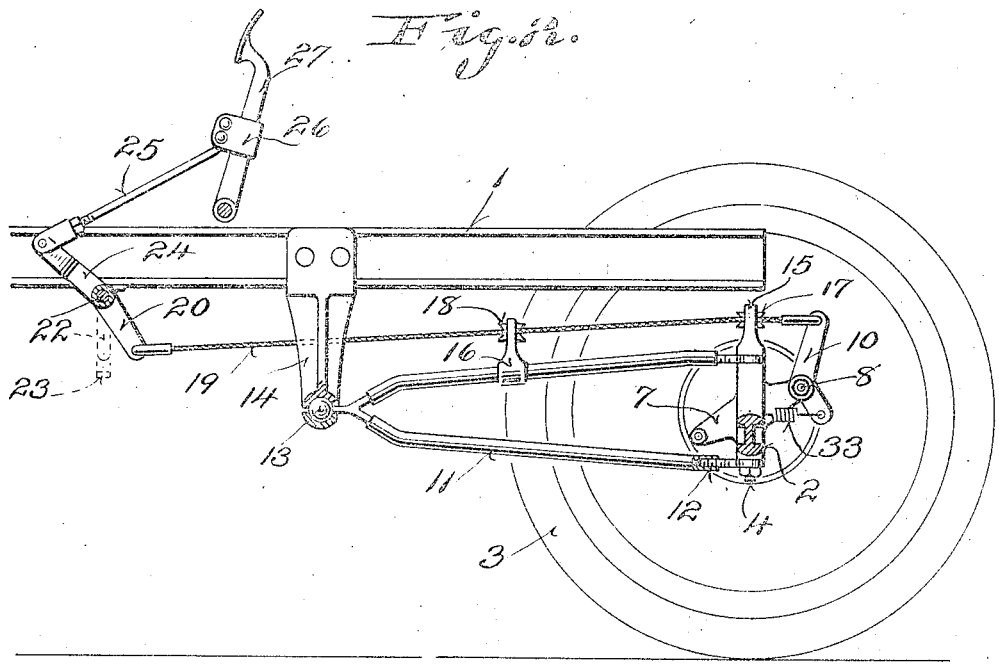
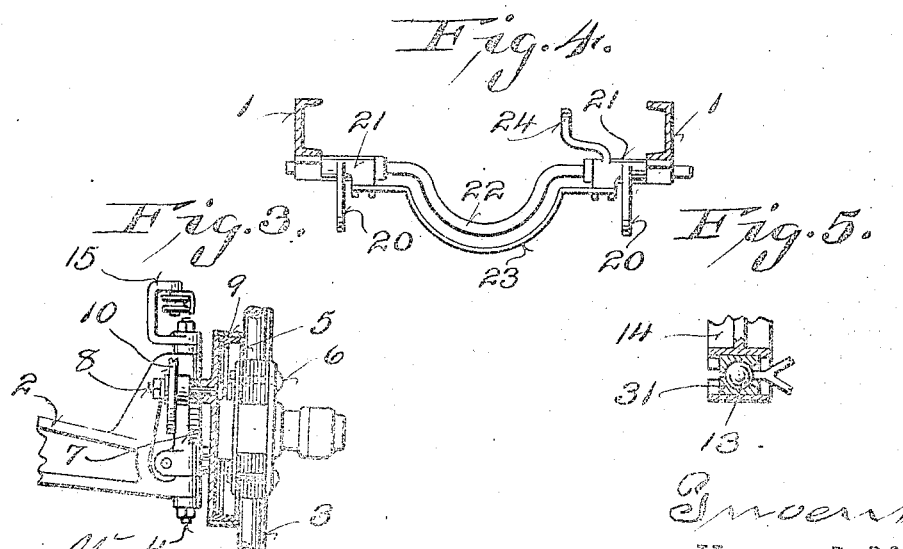

1,466,146

UNITED STATES PATENT OFFICE.

HENRY J. NOLL, OF MILWAUKEE, WISCONSIN.

FRONT-WHEEL BRAKE.

Application filed October 12, 1921. Serial No. 507,322.

*To all whom it may concern:*

Be it known that I, HENRY J. NOLL, a citizen of the United States, and resident of Milwaukee, in the county of Milwaukee and State of Wisconsin, have invented certain new and useful Improvements in Front-Wheel Brakes; and I do hereby declare that the following is a full, clear, and exact description thereof.

My invention relates to new and useful improvements in front wheel brakes which are more especially adapted for use in connection with motor vehicles.

The general object of the invention is to provide a device of this kind which is operable simultaneously with the operation of the rear wheel brakes and which will operate with equal efficiency with the front wheels in any position.

A further object of the invention is to provide an attachment of this kind which is strong and durable and in which suitable provision is made for bracing the steering knuckles against any unusual strain which may be caused by the application of the brakes of the front wheels.

It is also an object of the invention to provide suitable means by which the brake is particularly adapted for attachment to any of the various standard types of automobiles.

My invention will be described in connection with the accompanying drawings, in which:—

Figure 1 is a plan view of the front portion of an automobile frame with my invention applied thereto.

Figure 2 is a vertical longitudinal sectional view of the same.

Figure 3 is a detail view showing the details of the connection between the brake and front wheel and steering knuckle.

Figure 4 is a transverse sectional view on the line 4—4 of Figure 1.

Figure 5 is a detail view of a modified form of connection between the bracing fork and frame of the automobile.

In the drawings the numeral 1 designates the frame of the automobile having a front axle 2 and front wheels 3 which are pivotally supported on the steering knuckles 4 in the usual manner. In carrying out my invention I provide a brake drum 5 for each of the front wheels which may be secured to the inner side thereof by suitable bolts 6, the wheel being removed from the hub for this purpose. A bracket 7 is secured to the steering knuckle and transversely pivoted therein is a spindle 8 having the usual means at its inner end for applying the brake shoes 9 to the drum. The spindle is rocked by a lever 10 secured to its outer end for the purpose of applying the brake. In order to prevent the twisting or breaking of the steering knuckle by any sudden strain caused by the application of the brake I provide a forked brace 11, the front ends of which are in threaded connection with the eye bolts 12 journalled on the upper and lower ends of the knuckle. The rear end of the brace has a universal connection 13 with a bracket arm 14 secured to the frame of the automobile. In order that the braces may have the same relation to the knuckles under all conditions the connections 13 should be in alignment with the pivot of the "wish-bone" or bracing member which braces the front axle from the frame of the vehicle. The knuckle is formed with an upwardly extended arm 15 and preferably another arm 16 is carried on the upper branch of the bracing fork. Sheaves 17 and 18 are mounted in these arms and a cable 19 is trained over the sheaves and connected to one end of the lever 10 for actuating the same to apply the brakes. A coil spring 33 is preferably provided for holding the lever 10 to take up any possible slack in the cable 19 and to hold the same in engagement with the sheave. The rear end of the cable 19 is connected to a lever 20 which is secured to or integral with a sleeve 21 carried by the transverse rock shaft 22. It will be understood that a cable and actuating arm and sleeve may be provided for each of the front wheels and the sleeves 21 may be rigidly connected to each other by a transverse bar 23 as shown in Figure 4. One of the sleeves 21 has an upwardly extending arm 24 which is connected by a link 25 to a collar 26 which is longitudinally adjustable on the usual brake pedal 27 to vary the amplitude of movement of the brake shoes with relation to the throw of the brake pedal. It is of course understood that the brake pedal controls the rear wheel brakes (not shown) in the usual manner.

In the application of my device to an automobile in which longitudinal leaf springs are used for supporting the front end of the frame the pivotal connection 13 may be constructed with a slidable box 31 as shown in Figure 5 to allow for the longitudinal play between the frame and the front axle.

In applying my invention to the front wheels it is necessary to remove the speedometer gear. In order to take the place of this a ring gear 32 may be secured to the outer surface of the brake drum and a pinion may be provided for securing the proper ratio for driving the speedometer.

While I have shown and described a number of ways in which the invention may be applied to automobiles of standard make it will be understood that other changes and adaptations may be devised within the scope of the invention as claimed.

I claim as my invention:—

1. In an automobile having rear wheel brakes, a brake drum provided with means for attaching the same to the front wheel of an automobile, a brake shoe, means for attaching the same to the steering knuckle in cooperative relation to said drum, pivoted means for bracing said knuckle from the frame of the automobile, a lever for operating the brake shoe, and means for operatively connecting the lever to the brake pedal, whereby the front wheel brakes are operated simultaneously with the operation of the rear wheel brake.

2. The combination with the frame, brake pedal, front wheels and steering knuckles of an automobile, of a pair of brakes mounted in operative relation to said wheels, braces journaled at their front ends on the steering knuckles and pivotally connected at their rear ends to the frame, and means connected with the brake pedal for operating said brakes when the pedal is depressed.

3. The combination with the frame, brake pedal, front wheels and steering knuckles of an automobile, of a pair of brakes mounted in operative relation to said wheels, braces journaled at their front ends on the steering knuckles and pivotally connected at their rear ends to the frame, levers carried by the steering knuckles and operable to operate the brakes, sheaves supported by the steering knuckles and braces, and cables connected with the levers and carried over said sheaves and connected with the pedal, said cables and levers being operable when the pedal is depressed to apply the brakes.

4. The combination with a frame, front wheels, steering knuckles and front wheel spindles of an automobile, of front wheel brakes, means for controlling said brakes, and members bracing the steering knuckles above and below the front wheel spindles and secured to said frame.

5. The combination with a frame, front wheels, steering knuckles and front wheel spindles of an automobile, of front wheel brakes, means for controlling said brakes, and a pair of members having pivotal connection with the frame and each having a pair of forwardly extending arms bracing the corresponding steering knuckle at points above and below the spindle of the wheel.

In testimony that I claim the foregoing I have hereunto set my hand at Milwaukee, in the county of Milwaukee and State of Wisconsin.

HENRY J. NOLL.